Aug. 25, 1970   H. C. H. DARLEY   3,525,397

METHOD OF TEMPORARILY PLUGGING AN EARTH FORMATION

Filed Dec. 26, 1968   2 Sheets-Sheet 1

INVENTOR:
H. C. H. DARLEY
BY: Louis J. Bovasso
HIS ATTORNEY

United States Patent Office 3,525,397
Patented Aug. 25, 1970

3,525,397
METHOD OF TEMPORARILY PLUGGING AN EARTH FORMATION
Henry C. H. Darley, Houston, Tex., assignor to Shell Oil Company, New York, N.Y., a corporation of Delaware
Filed Dec. 26, 1968, Ser. No. 787,139
Int. Cl. E21b 33/138, 43/26
U.S. Cl. 166—283                     5 Claims

ABSTRACT OF THE DISCLOSURE

A method for temporarily preventing fluid invasion into a porous subterranean earth formation and subsequently permitting fluid flow thereto by dispersing a water-phase liquid in an oil-phase liquid and mixing the resultant dispersion with an amount of oil-wet, fine, acid-soluble solid particles sufficient to form an emulsion which is stable at the temperature of the earth formation only as long as the solid particles are present in their solid state. The earth formation is contacted with the emulsion at a pressure exceeding the pressure of fluid present in the earth formation so as to form a substantially impermeable, emulsified filter cake on the surface of the earth formation. The filter cake is subsequently contacted with an acidic fluid capable of dissolving the emulsion stabilizing solid particles so as to break down the emulsion and permit the fluid to invade the earth formation.

BACKGROUND OF THE INVENTION

Field of the invention

The present invention relates to a new and novel well completion and workover fluid having a relatively high viscosity at the temperature of the borehole of a well for use in situations in which temporary plugging of a permeable subsurface earth formation is required which on subsequent treatment is readily removed by readily converting the fluid to one of relatively low viscosity by contact with a second fluid without causing formation damage or swelling of clayey portions of the formation, or decreasing its susceptibility to consolidation treatment, or decreasing the permeability of the treated formation or its susceptibility to a fluid drive for oil recovery.

Description of the prior art

The completion and workover of oil and gas wells often require the plugging of perforations, screens and similar openings. In certain prior art processes, this can be done by injecting a plugging liquid into the well in a quantity sufficient to plug the perforations or other openings, and thereafter, restoring communication by injecting a solution adapted to dissolve the plugging material.

Proposed completion and workover fluids comprise oil-water emulsions or aqueous systems containing water or oil-soluble solids which are readily dissoluble in aqueous acidic or oil solvent solutions. Emulsion systems proposed in patents such as U.S. Pat. 2,898,294 or 3,007,865 and aqueous solutions are described in U.S. Pats. 3,000,818; 3,272,741; 3,353,600 or 3,353,604. Generally, with systems as described in these patents, it has been found that they are difficult to handle it requires a long time before their effectiveness is noted in respect to a restoration of permeability making them economically costly to use, they adversely affect the permeability of formations, they tend to plug perforations and portions of the formations and they are difficult to remove without causing damage to the formation and borehole on acid treatment.

SUMMARY OF THE INVENTION

It is an object of this invention to provide a method for temporarily preventing fluid invasion into an earth formation without adversely affecting the permeability of the formation.

It is still a further object of this invention to provide a method of forming a formation plugging material which may be readily unplugged without causing damage to the earth formation.

These objects are preferably accomplished by dispersing a water-phase liquid in an oil-phase liquid and mixing the resultant dispersion with an amount of oil-wet, fine, acid-soluble solid particles sufficient to form an emulsion which is stable at the temperature of the earth formation only as long as the solid particles are present in their solid state. In temporarily plugging the face of an earth formation the earth formation is contacted with the emulsion at a pressure exceeding the pressure of fluid present in the earth formation so as to form a substantially impermeable, emulsified filter cake on the surface of the earth formation. The filter cake is subsequently contacted with an acidic fluid capable of dissolving the emulsion-stabilizing solid particles so as to break down the emulsion and permit the fluid to invade the earth formation. The particles are preferably chalk, marble, or the like.

In displacing a material within a well with a fluid having a temporarily relatively high viscosity, the step of dissolving the acid-soluble emulsion-stabilizing solid particles is conducted so that, after a selected length of travel within the well conduit, the intermingling of the fluids causes the emulsion to break and form a mixture of liquid solutions having relatively low viscosities. Where the oil-phase components of the emulsion predominate in nonviscous hydrocarbons, such as diesel oil, the emulsions break to a mixture of an aqueous solution and a hydrocarbon solution which each have a viscosity substantially equal to the viscosity of water. Where desirable, an inert fluid, such as water, can be spotted between the emulsion and the acidic solution to adjust the distance along which the two fluids will travel through a well conduit before the emulsion is broken due to the reaction of the acidic solution with the acid-solution emulsion-stabilizing particles.

Formations thus treated may be effectively consolidated by the use of resinous materials, e.g., epoxy resins as described in U.S. Pats. 3,339,633; 3,368,625; and 3,368,626 and/or subjected to a drive fluid to effectively recover the oil from such treated formations. The drive fluids may contain surfactants, thickeners and mixture thereof.

DESCRIPTION OF THE PREFERRED EMBODIMENT

Figure 1:
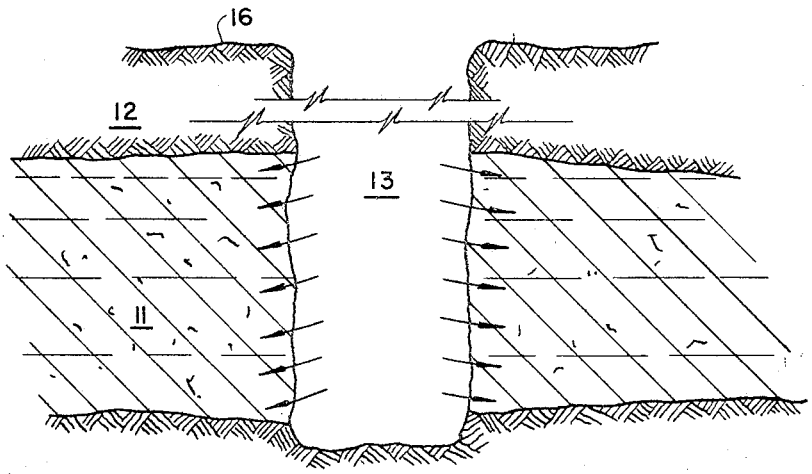
FIG. 1 is a vertical sectional view of a permeable formation prior to application of the teachings of this invention.

Referring to FIG. 1 of the drawing, a porous subterranean earth formation, such as a permeable formation 11, is shown disposed below over-burden 12. A well borehole 13 extends down into formation 11 to a point at least below the bottom of formation 11. As indicated by the arrows in FIG. 1, undesirable fluid invasion of formation 11 is taking place from borehole 13.

Figure 2:
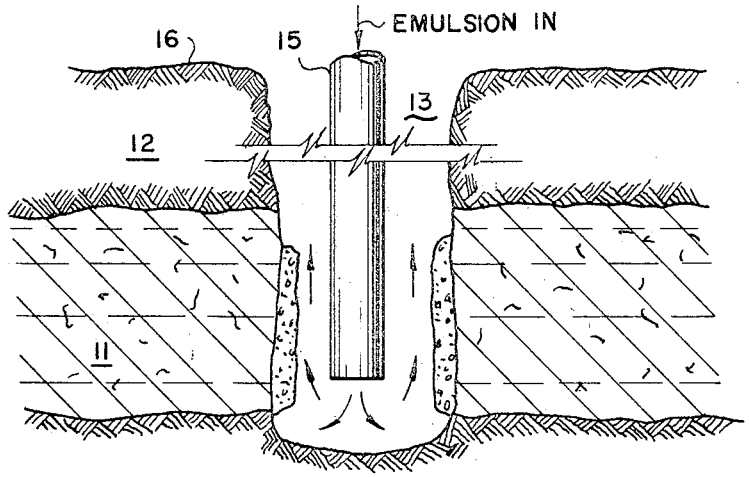
FIG. 2 is a vertical sectional view of the permeable formation of FIG. 1 treated in accordance with the teachings of this invention.
Figure 3:
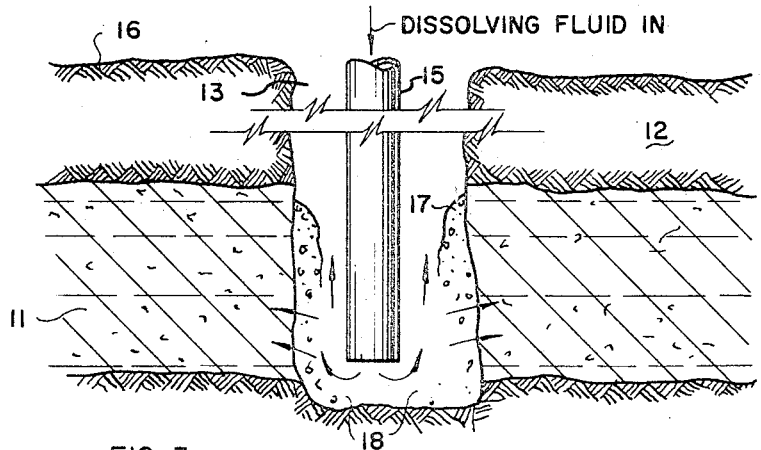
FIG. 3 is a vertical sectional view of the application of the teachings of this invention applied to the treated permeable formation of FIG. 2.

In accordance with the teachings of this invention, as illustrated in FIG. 2, a tubing string 15 is extended from the earth surface 16 and into communication with formation 11. An oil-water emulsion, formed in a manner to be discussed further hereinbelow, is injected down tubing string 15 and into contact with the surfaces of formation 11 in communication with borehole 13 so as to form a substantially, impermeable, emulsified, filter cake 17 on the surface of formation 11, as illustrated in FIG. 2. If any injection into formation 11 occurs, it is only that due to a hydrostatic overbalance of the fluid pressure in the borehole 13 relative to that information 11. Subsequently, a fluid capable of dissolving the filter cake 17 is injected through tubing string 15 and into contact with filter cake 17. Thus, as illustrated in FIG. 3, the solid components of filter cake 17 are dissolved and the emulsion breaks to form a relatively non-viscous mixture of oil-phase and water-phase liquids. Fluids may again enter formation 11 as illustrated in FIG. 1.

The emulsion injected into borehole 13 is a water-in-oil emulsion stabilized by acid-soluble solid particles, such as chalk or marble. The emulsion is formed by dispersing a water-phase liquid into an oil-phase liquid and mixing the resultant dispersion with sufficient oil-wet, fine acid-soluble, solid particles to form an emulsion which is stable at the temperature of formation 11 only as long as the solid particles are present. The emulsion contacts the surfaces of formation 11 at a pressure exceeding the pressure of the fluid within the formation 11 so as to form filter cake 17. The subsequent contacting of filter cake 17 by the dissolving fluid dissolves the emulsion-stabilizing solid particles so as to break down the emulsion and permit fluid to invade formation 11.

Preferably, the oil phase is diesel oil to which a small percentage of tall oil is added. The emulsion is formed by dispersing a water-phase liquid, as for example, a six percent sodium chlorine-water liquid, in the oil phase. The six percent sodium chlorine-water combination prevents swelling and dispersion of any water-sensitive clays that may be in the reservoir rocks of oil-shale formation 11. At this point, the fluid mixture is not yet emulsified. The mixture does not emulsify until the fine, solid particles are added. If desired, a small amount, as for example .1 to .2% of Redicote E 11, a catonic surfactant manufactured by the Armour Industrial Chemical Co. may be added to the oil-water mixture to promote dispersion of the water into the oil phase thus making the mixing easier and providing greater mechanical and thermal stability provided the proportion of Redicote E 11 is kept within a critical range. This range is narrow at low oil/water ratios. The addition of the Redicote E 11 results in excellent dynamic and static filtration properties. The rate of subsequent destabilization of the filter cake 17 by the addition of the acid may be adjusted by varying the proportions of tall oil and Redicote E 11 in the emulsion.

The fine, solid particles are preferably finely-divided carbonate particles such as chalk. For example, a pure grade of calcium carbonate having a median particle size of about $2\mu$ may be used. However, mixtures of several size ranges of particles may be used to provide a continuous range from very fine to particles coarse enough to bridge the pores of formation 11 thus preventing the penetration of fluid into unconsolidated sands. Ground carbonates may also be added in large amounts to increase the density of the emulsions.

The following table is an example of exemplary properties of an emulsion prepared in accordance with the teachings of this invention as will be discussed further hereinafter:

TABLE I

Density—7.3–10–4 lb./gal.
Plastic viscosity—10–100 cp.
Yield point—5–50 lb./100 ft.$^2$
API filter loss—3–6 cc./30 min., 73° F.
Dynamic filter loss on 2400 md. sandstone at 155° F.:
    Mud spurt—<0.1 cc./cm.$^2$
    Filtrate rate at
        11 ft./sec. mud velocity—$12 \times 10^{-3}$ cc./cm.$^2$/min.
    Filtrate rate at
        3 ft./sec. mud velocity—$4 \times 10^{-3}$ cc./cm.$^2$/min.
    Filtrate rate at
        Static mud velocity—$1 \times 10^{-3}$ cc./cm.$^2$/min.
    Filtrate—oil
    Filtrate cake—too thin to measure Thermal stability for quiescent emulsions at 160° F. varied from 6 hours to >1 week, depending on the formulation.

When the particles, hereinafter referred to as "chalk," are added to the water-in-oil and wetting agent mixture, the mixture emulsifies and an emulsion is formed. Thus, when acid is subsequently injected down tubing string 15 into the contact with filter cake 17, the chalk is dissolved by the acid and immediate separation into two phases takes place. The small percentage of tall oil preferably added to the diesel oil brings the chalk to the desired degree of oil-wetness so that the particles are absorbed at the oil-water interfaces around the water droplets, thus stabilizing the emulsion.

A preferred grade of tall oil is Arizona Chemical Company's Acintol FA 1, a high quality, fractionated clear fluid containing 94 percent oleic and linoleic acid. The ratio of oil to water may be varied according to the viscosity desired. For example, a preferred ratio is 30 to 40 percent oil to water. The diesel oil preferably contains between one and three percent tall oil; higher concentrations may give greater emulsion stability and lower filter loss. The optimum amount of chalk, such as carbonate powder, preferably lies between three and six pounds per barrel of oil and water. Larger amounts of chalk may further stabilize the emulsion.

In general, the order of mixing the oil, water, and chalk is important. If tall oil is added to the diesel oil, it must be added to the diesel oil and the chalk must be added while the oil and water phases are being mixed together. The chalk may be added after the oil, water, and surfactants have been mixed but oil and water must be agitated violently while the chalk is being added in order to form the emulsion. In certain of the formulations, particularly those which do not contain an effective amount of a cationic surfactant, if the chalk is added first to either the oil or the water phase, the chalk may be wet by, and remain in that phase, and no emulsion will be formed.

The No. 10 White of emulsion No. 5 is a ground marble manufactured by the Georgia Marble Company of Tate, Ga., having a median particle size $17\mu$. The Micro and Fine grade Sluggits (8 Micro S1 and Fine S1), are ground marble manufactured by the Chemical Additives Company of Houston, Tex.

The addition of a suitable surfactant to the acid which is subsequently utilized to break the emulsion, as discussed hereinabove, greatly accelerates the action of the acid. Any hydrophyllic surfactant, compatible with the acid, may be used. Another example of a suitable surfactant is a combination of two surfactants commonly used in oil well acidizing—Halliburton Company, HA1 45, corrosion inhibitor, and Pen 5, a wetting agent. This latter surfactant was used in the percentages indicated hereinabove to break the emulsions of Table II. Thus, Table III, hereinbelow, shows the time required for the acid (i.e., the HCL) to break the respective emulsion increases with the more stable emulsions. It was found that filter cakes were completely destroyed in times which varied from a few minutes for cakes of low stability emulsions to one hour for cakes made from the very stable emulsions.

may be incorporated in the emulsion is apparently limited only by the pumpability of the emulsion. The density of the emulsion may be controlled by varying the oil/water

TABLE II.—PROPERTIES OF TYPICAL CHALK EMULSIONS

[Amounts to make 100 bbls. of emulsion]

| | Diesel oil, bbl. | Water or brine,[1] bbl. | Acintol FA₁, gals. | Redicote E₁₁, gals. | Sluggits, lbs./bbl. | | | Density lb./gals.[2] | Apparent visc. cp. | API fil. loss, cc./30 m. | Max. B.H. temp., °F. | Est. cost per bbl.,[3] dollars |
|---|---|---|---|---|---|---|---|---|---|---|---|---|
| | | | | | Micro | Fine | Med. | | | | | |
| (1) For low temperature | 40 | 60 | 17 | 4 | 3 | 1.5 | 0 | 8 | 44 | 5.4 | 200 | 9.85 |
| (2) For moderate temperature | 40 | 60 | 17 | 8 | 3 | 1.5 | 0 | 8 | 47 | 4 | 300 | 0.98 |
| (3) For clay contamination or high temperature | 39 | 60 | 34 | 16 | 3 | 1.5 | 0 | 8 | 49 | 4 | 400 | 1.33 |
| (4) For low density or low viscosity or to get oil filtrate | 59 | 40 | 26 | 4 | 3 | 1.5 | 0 | [4]7.2 | 9 | 6.6 | 200 | 0.90 |
| (5) For high density | 59 | 40 | 50 | 8 | [5]350 | 10 | White[6] | [7]11.7 | 97 | 4 | 400 | 4.20 |
| (6) For high viscosity | 29 | 70 | 25 | 8 | 3 | 1.5 | 0 | 8.15 | 120 | 4 | 200 | 1.02 |
| (7) For coarse, highly permeable reservoir | 40 | 60 | 17 | 4 | 3 | 1.5 | 15 | 8 | 44 | 5.4 | 200 | 1.06 |

[1] Brine or formation water is used if reservoir is water-sensitive.
[2] Density of diesel oil .836. Density of brine 1.037.
[3] Covers cost of Acintol FA¹, Redicote E¹¹ and carbonates only.
[4] Lower gravity oil is used to obtain lower densities.
[5] Lb./bbl.
[6] Increases volume of emulsion to 140 bbl. Cost of carbonate taken as 1.5¢/lb.
[7] Maximum.
[8] Pills containing 15 lb./bbl. of each grade Sluggit are used to combat lost circulation.

TABLE III.—EFFECT OF FORMULATION ON ACID REACTIVITY

Water phase all emulsions, 6% NaCl
Acid, 15% HCl plus surfactants as shown
Temperature of air-bath 160° F.[1] except as shown

| Experiment No.: | Percent v. diesel oil | Acintol FA₁ as percent v. of diesel | Redicote E₁₁, percent | Sluggits, lb./bbl. | | Surfactants in acid | Mins. for 90% em. breakdown |
|---|---|---|---|---|---|---|---|
| | | | | Micro | Fine | | |
| 1 | 40 | 1 | .1 | 3 | 1.5 | .5% HA1 45 plus .2% Pen 5 | 20 |
| 2 | 40 | 1 | .1 | 16 | 1.5 | do | 11 |
| 3 | 40 | 1 | .2 | 3 | 1.5 | do | 37 |
| 4 | 40 | 2 | .1 | 3 | 1.5 | do | 90 |
| 5 | 40 | 2 | .2 | 3 | 1.5 | do | ~300 |
| 6 | 40 | 2 | .4 | 3 | 1.5 | do | ~300 |
| 7 | 60 | 1 | .1 | 3 | 1.5 | do | 55 |
| 8 | 60 | 2 | .4 | 3 | 1.5 | do | ~300 |
| 9 | 80 | 1 | .2 | 3 | 1.5 | do | 110 |
| 10 | 30 | 2 | .2 | 3 | 1.5 | do | 100 |
| 11 | 40 | 1 | .1 | 3 | [2]1.5 | do | 60 |
| 12 | 40 | 1 | .1 | 3 | 1.5 | do | [3]40 |

[1] Reactants took up to 45 minutes to reach temperature.
[2] Emulsion made with fresh water instead of 6% NaCl.
[3] At 75° F.

Table IV, hereinbelow, shows "mud" spurts obtained when the various emulsions were filtered against loose sandpacks of varying permeability. The obtained values are low considering the fluids involved contained very few bridging solids and these values may be compared with a value of 25 cc. obtained with a 2 pound per barrel suspension of HiLow gel containing the same amount of bridging solids.

ratio, the salinity of the water phase and the amount of chalk. The use of highly saline brines may decrease the thermal stability of the emulsion but this may be offset by increasing the chalk content.

With the foregoing preferred combinations, the quantities of carbonates listed in Table II may be used with varying results. The choice of acid to be used with the various emulsions depends on the breaking time required.

TABLE IV.—STATIC FILTRATION PROPERTIES OF CHALK EMULSIONS ON SANDSTONES AND SAND PACKS

[100 p.s.i. pressure]

| Expt. No. | Diesel oil | Acintol percent FA₁ in diesel | Percent Redicote F₁₁ | Lb./bbl. Sluggits | | | Permeability, md. | Depth of mud spurt invasion, cm. | Filter loss, cc./cm.² in 3 hrs. |
|---|---|---|---|---|---|---|---|---|---|
| | | | | Micro 20-<2μ | Fine 40-3μ | Med. 400-50μ | | | |
| Tests on sand packs at 23° C.: | | | | | | | | | |
| 1 | 40 | 2 | .2 | 3 | 1.5 | 1.5 | 28,400 | 8.2 | .14 |
| 2 | 40 | 2 | .2 | 16 | 16 | 16 | 27,500 | 2.2 | .14 |
| 3 | (¹) | (¹) | | 3 | 1.5 | 1.5 | 28,600 | 24 | .62 |
| 4 | (¹) | (¹) | | 16 | 16 | 16 | 35,300 | 11.6 | 1.9 |
| 5 | 40 | 2 | .2 | 3 | .15 | | ~5,000 | 3.1 | .14 |
| 6 | (²) | | | 3 | 1.5 | | ~5,000 | 11 | .42 |
| Gilderhauzen sandstone, 7 | 40 | 2 | .2 | 3 | 1.5 | | 2,400 | 1.4 | .2 |
| Berea sandstone cores, tests at 160° F.: | | | | | | | | | |
| 8 | 40 | .1 | .1 | 3 | 1.5 | | 63 | .3 | .2 |
| 9 | (³) | | | 3 | 1.5 | | 35 | 1.4 | 2.2 |

[1] .56% Bex—Bex is carboxyl-ethyl-cellulose marketed by Chemical Additives, Houston.
[2] .56% HiLow Gel—HiLow gel is a guar gum marketed by Sand Control, Inc., Lafayette.
[3] 1.5% Heal S—Heal S is an acid-soluble lignosulfonate marketed by Chemical Additives.

If desired, the viscosity of the foregoing emulsions may be raised by adding water plus the proportionate amount of Redicote E 11 and chalk, or the viscosity may be lowered by adding diesel oil plus the proportionate amount of tall oil and Redicote E 11 (since the proportionate of Redicote E 11 is based on the gross volume of the emulsion).

Increasing the amount of chalk increases the stability and viscosity of the emulsion. The amount of chalk that An acid of 15% HA is preferably used for formation acidification of emulsions containing surfactants of .5% HA1 45 and .2% Pen 5 which are commonly used by the Halliburton Company. There are many other suitable surfactants which may be used.

Although there is no one preferred emulsion, the emulsion used depending on the conditions encountered as set forth in Table II, the following is an example of one preferred emulsion.

TABLE V

| | Maximum concentration | Minimum concentration |
|---|---|---|
| Diesel oil | 80% | 30%. |
| Tall oil | 4% of oil phase | ½% of oil phase. |
| E₁₁ | 1.5% of gross emulsion | ½ of gross emulsion. |
| Carbonates | 400 lb./bbl | 1½ lb./bbl. |

Figure 4:
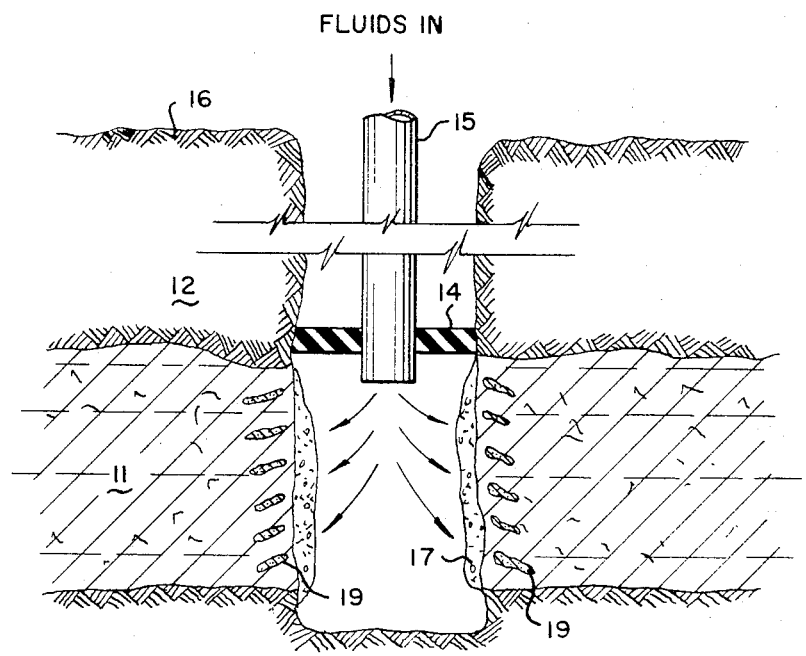
FIGS. 4 and 5 are vertical sectional views of further applications of the teachings of this invention applied to a permeable formation.

In addition to the well completion-fluid uses of this invention as disclosed hereinabove, the emulsion of this invention may be used to prevent the overdisplacement of earth formation-treating liquids. For example, as illustrated in FIG. 4 wherein like numerals refer to a like parts of FIG. 3, a treating liquid, such as sand-consolidating resin 19, is shown disposed inwardly of oil-shale formation 11 only a short distance from the face thereof. The treating liquid is followed by a slug of the emulsion of this invention so that the emulsion forms filter cake 17 on the wall of oil-sand formation 11 but does not penetrate and thereby displace the resin 19 further into formation 11 (as would a conventional fluid, such as water). Such a temporary-plugging action is desirable where it is desired to consolidate only the portions of earth formation 11 adjacent to or on the face thereof. The slug of emulsion acts as a piston to displace the treating liquid into but not beyond the face of the formation 11. Typical treating liquids, such as epoxy resins, and the manner of injecting such liquids are described in the following U.S. Pats. 3,294,165; 3,294,166; 3,291,213; 3,368,625; 3,368,626; and 3,339,633.

Figure 5:
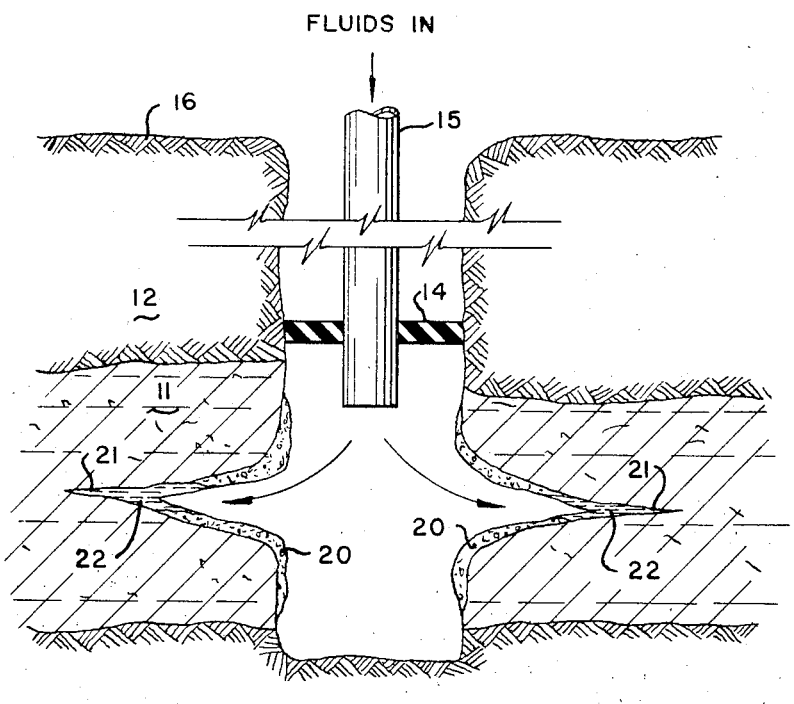

Referring now to FIG. 5, wherein like numerals again refer to like parts of FIG. 3, the emulsion of the present invention may be used in a fracturing operation to reduce the loss of fracturing fluid being used to hydraulically form and extend a fracture in a somewhat porous earth formation, such as formation 11. Alternatively, the formation may be hydraulically fractured by injecting a fracturing fluid into the formation to form a fracture therein prior to contacting the formation with the conclusion.

Thus, as can be seen in FIG. 5, the injected emulsion forms a coating 20 which temporarily plugs the walls of the fracture 21 while fluid 22, which may be more of the emulsion, is pumped from an external source (not shown) through fracture 21 to extend fracture 21 as is well known in the art.

In both cases, that is the displacing treatment of FIG. 4 and the fracturing treatment of FIG. 5, the solidified emulsion (i.e., filter cake 17 and coating 20, respectively) may be "broken down" and removed by injecting acid as discussed hereinabove with respect to the embodiment of FIGS. 1 through 3.

Equipment and techniques of the type used in conventional well-completion or fracturing operations may be used to displace the emulsion into contact with the portions of a formation, such as formation 11, to be temporarily plugged. In well-completion operations, this involved circulating the emulsion into borehole 13 so that it displaces the fluid that was previously present and becomes spotted adjacent to the formation 11 under a hydrostatic and/or pump-applied pressure providing a downhole pressure in the borehole fluid that exceeds the formation fluid pressure. The emulsion of the present invention may sometimes advantageously be used as the drilling fluid which is circulated during the drilling into the interval wherein borehole 13 is to be completed. In fracturing operations, such as illustrated in FIG. 5, the emulsion is simply injected into the fractures being formed or extended at a pressure sufficient to force the fluid into the earth formation.

The filter cakes of this invention may be removed by suitable means such as by use of any acidic, gaseous or liquid fluids. Where desirable, fluids may be backflowed from the portion of formation 11 that was contacted by the emulsion prior to contacting such portions with a pH-adjusting fluid. However, although such a backflowing removes at least the bulk of the filter cake and restores a significant portion of permeability, a substantially complete restoration of the natural permeability of formation 11 necessitates the contacting of the temporary plugged portion of formation 11 with an acidic fluid as discussed hereinabove.

I claim as my invention:

1. A method for temporarily preventing fluid invasion into a porous subterranean earth formation and subsequently permitting fluid flow thereto, said method comprising the steps of:
  dispersing a water-phase liquid in an oil-phase liquid and mixing the resultant dispersion with an amount of oil-wet, fine, acid-soluble solid particles sufficient to form an emulsion which is stable at the temperature of the earth formation only as long as the solid particles are present in their solid state;
  contacting the earth formation with the emulsion at a pressure exceeding the pressure of fluid present in the earth formation so as to form a substantially impermeable, emulsified filter cake on the surface of the earth formation; and
  subsequently contacting the filter cake with an acidic fluid capable of dissolving the emulsion-stabilizing solid particles so as to break down the emulsion and permit fluid to invade the earth formation.

2. The method of claim 1 including the step of adding a predetermined amount of cationic emulsifier to the emulsion.

3. The method of claim 1 including the step of extending at least one well into a position adjacent to said porous earth formation; and subsequently injecting said emulsion down said well and into said formation.

4. The method of claim 1 including the step of injecting an earth-formation treating liquid into said formation prior to contacting the earth formation with said emulsion, said emulsion driving said treating liquid into said formation.

5. The method of claim 1 including the step of hydraulically fracturing said formation by injecting a fracturing fluid into said formation to form a fracture therein prior to contacting the earth formation with said emulsion; and subsequently injecting more fracturing fluid into said fracture while contacting the walls of said fracture with said emulsion.

References Cited

UNITED STATES PATENTS

| 2,935,129 | 5/1960 | Allen et al. | 166—283 X |
| 3,228,470 | 1/1966 | Papaila | 166—283 X |
| 3,353,600 | 11/1967 | Annis et al. | 166—294 |
| 3,374,835 | 3/1968 | Knox | 166—283 X |
| 3,415,318 | 12/1968 | Meijs | 166—292 |

ERNEST R. PURSER, Primary Examiner

I. A. CALVERT, Assistant Examiner

U.S. Cl. X.R.

166—294, 308